(12) United States Patent
Feustel et al.

(10) Patent No.: US 12,500,538 B2
(45) Date of Patent: Dec. 16, 2025

(54) METHOD FOR DETERMINING PHASE CURRENTS, CONTROL DEVICE, DRIVE SYSTEM, AND MOTOR VEHICLE

(71) Applicant: Bayerische Motoren Werke Aktiengesellschaft, Munich (DE)

(72) Inventors: Silko Feustel, Munich (DE); Daniel Glose, Munich (DE); Jovan Knezevic, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 181 days.

(21) Appl. No.: 18/283,030

(22) PCT Filed: May 10, 2022

(86) PCT No.: PCT/EP2022/062555
§ 371 (c)(1),
(2) Date: Sep. 20, 2023

(87) PCT Pub. No.: WO2022/258277
PCT Pub. Date: Dec. 15, 2022

(65) Prior Publication Data
US 2024/0171106 A1 May 23, 2024

(30) Foreign Application Priority Data
Jun. 11, 2021 (DE) .................... 10 2021 115 138.4

(51) Int. Cl.
*H02P 23/14* (2006.01)
*B60L 15/20* (2006.01)
*G01R 25/00* (2006.01)

(52) U.S. Cl.
CPC ............. *H02P 23/14* (2013.01); *G01R 25/00* (2013.01); *B60L 15/20* (2013.01); *B60L 2240/429* (2013.01)

(58) Field of Classification Search
CPC . H02P 23/14; H02P 6/28; H02P 21/22; G01R 25/00; G01R 19/16547; B60L 15/20; B60L 2240/429
See application file for complete search history.

(56) References Cited

U.S. PATENT DOCUMENTS

| 7,893,650 B2 * | 2/2011 | Arnet ...................... H02P 21/22 |
| | | 318/599 |
| 2008/0265829 A1 * | 10/2008 | Hayashi .................. H02P 21/18 |
| | | 318/801 |

(Continued)

FOREIGN PATENT DOCUMENTS

| DE | 10 2019 130 638 A1 | 5/2020 |
| EP | 2 607 914 A1 | 6/2013 |

(Continued)

OTHER PUBLICATIONS

International Search Report (PCT/ISA/210) issued in PCT Application No. PCT/EP2022/062555 dated Oct. 10, 2022 with English translation (4 pages).

(Continued)

*Primary Examiner* — Bickey Dhakal
(74) *Attorney, Agent, or Firm* — Crowell & Moring LLP

(57) ABSTRACT

A method for determining phase currents for current control of an electric machine of a drive system for a motor vehicle is provided. Measured characteristics of the phase currents that are supplied to at least three phases of a set of phases of the electric machine and that are measured by at least three phase current sensors of a set of phase current sensors of the drive system are received. Zero crossings in the at least three measured phase current sensor-specific characteristics are identified, a phase current value of at least one other characteristic is determined, per characteristic, for at least one zero crossing. The phase current values are used for determining a characterization value, describing a gain fac- (Continued)

tor of each phase current sensor, for the respective phase current sensor, and the phase currents for the current control are determined based on the characterization values of the phase current sensors.

8 Claims, 2 Drawing Sheets

(56) References Cited

U.S. PATENT DOCUMENTS

| | | |
|---|---|---|
| 2009/0189553 A1 | 7/2009 | Arnet |
| 2020/0162001 A1 | 5/2020 | Jeong et al. |

FOREIGN PATENT DOCUMENTS

| | | | |
|---|---|---|---|
| JP | 2006-304483 A | | 11/2006 |
| JP | 2009303283 A | * | 12/2009 |
| JP | 2010110067 A | * | 5/2010 |
| WO | WO-2012126029 A2 | * | 9/2012 ......... G01R 33/0023 |

OTHER PUBLICATIONS

German-language Written Opinion (PCT/ISA/237) issued in PCT Application No. PCT/EP2022/062555 dated Oct. 10, 2022 with English translation (10 pages).

\* cited by examiner

METHOD FOR DETERMINING PHASE CURRENTS, CONTROL DEVICE, DRIVE SYSTEM, AND MOTOR VEHICLE

BACKGROUND AND SUMMARY OF THE INVENTION

The present invention relates to a method for determining phase currents for current control of an electric machine of a drive system for a motor vehicle. Measured characteristics of the phase currents that are fed to at least three phases of a set of phases of the electric machine and that are measured by at least three phase current sensors of a set of phase current sensors of the drive system are received. The invention further relates to a control device, a drive system and a motor vehicle.

Interest is focused here on drive systems for electrically drivable motor vehicles which have at least one electric machine. The electric machine is designed to deliver a specific torque or drive torque for the motor vehicle, and comprises a stator and a rotor mounted rotatably in relation to the stator. The stator normally has at least one set of phases with at least three phases or stator phases. A multiphase current for generating a torque-specific rotating magnetic field in the stator is fed to the at least one set of phases. For this purpose, each phase is electrically connected to an inverter line of an inverter of the drive system, via which an, in particular sinusoidal, phase current is fed to each phase. The three phase currents form the multiphase current.

In order to control the phase currents, the drive system has a current controller which can predefine reference characteristics of the phase currents based on actual characteristics of the phase currents. A set of phase current sensors which has, for example, a phase current sensor for each phase is normally provided to measure the actual characteristics. The measured actual characteristics of the phase currents can deviate from the real actual characteristics due to different gain factors of the phase current sensors. These different gain factors can have a negative effect on the operation of the inverter.

The inverter has a determined operating range which is increased by a tolerance range in respect of peak values of the phase currents. The inverter is normally deactivated in the event of peak currents outside the tolerance range. The peak currents can depart from the tolerance range of the inverter particularly if at least one phase current sensor outputs a measured characteristic of the phase current which lies below the real characteristic of the phase current due to a gain factor that is too low. To prevent this, the phase current sensors are normally calibrated on a regular basis. The offset values on one hand, and the gain factors of the phase current sensors on the other hand are set for this purpose. The offset value is applied in the case of a certain zero current, i.e., when the drive system is in a deactivated state. The gain factor is normally determined by means of a phase-locked loop (PLL) during the operation of the drive system. The procedure for determining the gain factor has proven to be slow and imprecise.

An object of the present invention is to provide a solution with which phase currents for current control of an electric machine of a drive system of a motor vehicle can be determined in a simple and precise manner.

This object is achieved according to the invention by a method, a control device, a drive system and a motor vehicle with the features as claimed in the respective independent patent claims. Advantageous embodiments of the invention form the subject-matter of the dependent patent claims, the description and the figures.

A method according to the invention serves to determine phase currents for current control of an electric machine of a drive system for a motor vehicle. In the method, measured characteristics of the phase currents that are fed to at least three phases of a set of phases of the electric machine and that are measured by at least three phase current sensors of a set of phase current sensors of the drive system are received. Furthermore, zero crossings in the at least three measured phase current sensor-specific characteristics are identified, and a phase current value of at least one other characteristic is determined, per characteristic, for at least one zero crossing. The determined phase current values are taken as a basis for determining a characterization value, describing a gain factor of each phase current sensor for the respective phase current sensor. The phase currents for the current control are determined taking into consideration the characterization values of the phase current sensors.

The invention further relates to a control device for a drive system of a motor vehicle which is designed to carry out a method according to the invention. The invention additionally relates to a drive system for a motor vehicle which has at least one electric machine. The electric machine has at least one set of phases, in each case with at least three phases. The drive system further comprises a set of phase current sensors having at least three phase current sensors for measuring the phase currents fed to the phases, and also a control device according to the invention. The electric machine, which has a stator and a rotor, can, for example, be a permanently excited synchronous motor (PSM) or a current-excited synchronous machine (SSM) and can deliver a drive torque for the motor vehicle. The electric machine can, for example, be a three-phase machine and therefore have a set of phases with three (stator) phases. The electric machine can also be a six-phase machine and can have two sets of phases in each case with three phases. The at least one set of phases is electrically connected to an inverter of the drive system which converts the DC current delivered by an electric energy store of the drive system into a multiphase AC current for the set of phases. The multiphase current consists, in particular, of three sinusoidal, phase-shifted phase currents which are impressed into the phases of the electric machine.

In order to control the multiphase current, the drive system further has a set of phase current sensors for each phase. The set of phase current sensors has, in particular, a phase current sensor for each phase which measures the phase current of the respective phase on the inverter output side and on the machine input side. Since these measured actual characteristics of the phase currents form the basis for the current control and are dependent on the gain factors of the phase current sensors, the gain factors of the phase current sensors are validated and taken into consideration in determining the phase currents. The zero crossings are determined from the measured, phase-specific current characteristics for this purpose. During a fundamental wave period, each phase undergoes two zero crossings in the temporal current characteristic. Since the phase current sensors have already been calibrated at zero current (offset calibration), the current characteristics of the other two phases can be compared with one another in terms of the gain factors of the associated phase current sensors. Depending on the measured phase current value of at least one phase current sensor at the measured zero crossing of a different phase current sensor, the phase current sensor-specific characterization value, which is in turn dependent on the gain factor of this phase current sensor, is determined for this purpose. The phase currents used for the current control can then be determined depending on the phase current sensor-specific characterization values, and therefore depending on the gain factors of the phase current sensors.

It can be provided that the phase currents for the current control are determined taking into consideration the characterization values by selecting the two phase current sensors having the highest gain factors on the basis of the characterization values, wherein the two characteristics measured by these two phase current sensors are used for the current control and a third characteristic is determined from the two measured characteristics and is used for the current control. In particular, the two phase current sensors with the highest gain factors are selected by filtering out the phase current sensor with the lowest gain factor on the basis of the characterization values. If the stator phases are star-connected, the phase currents add up to zero at any time, so that the third phase current can be calculated from two measured phase currents. The phase current sensors which have the highest gain factors can be selected by means of the method on the basis of the characterization values and can be used to measure the phase current characteristics of two of the three phases for the current control. The characteristic of the third phase is not measured by the phase current sensor with the lowest gain, but is calculated from the other two characteristics. The current control is therefore carried out only by means of the phase current sensors with the highest gain factors. Current peaks resulting from the incorrect current control due to a gain factor that is too low can thus be avoided and the tolerance range of the inverter can advantageously be increased as a result.

In one embodiment of the method, the phase current value of the characteristic measured by a phase current sensor at a zero crossing of a different characteristic is determined as the characterization value of this phase current sensor. At determined zero crossings of the characteristics, for example, the associated phase current values of the other characteristics which are located, for example, on the rising edge are determined as the characterization values. At least one characterization value in the form of a phase current value is thus obtained for each phase current sensor, wherein the phase current values of the phase current sensors can be compared with one another. If the gain factors of the phase current sensors are, ideally, identical, the phase current values of the different phases should be identical. If they are different, this can indicate different gain factors of the phase current sensors. However, this requires an unchanging fundamental wave amplitude of the current characteristics over a lengthy time period.

In one preferred embodiment of the method, for each zero crossing of a characteristic, the associated phase current values of the other two characteristics are determined, a relative deviation of the gain factors of the two associated phase current sensors is determined on the basis of these phase current values and the characterization values are determined on the basis of the relative deviations. In particular, the relative deviation of the gain factors of two phase current sensors is determined as the difference of the associated phase current values in relation to the arithmetic mean value of the phase current values. For a zero crossing of each characteristic, a phase pair can therefore be determined from the phase current values of the other two characteristics. This embodiment offers the advantage that it is resistant to small changes in the fundamental wave amplitudes which are commonplace, even in the stationary state.

Two zero crossings are preferably identified per fundamental wave period of a characteristic and the phase current values of the other two characteristics are determined at each zero crossing. Two relative deviations of the gain factors of the phase current sensors are then determined per fundamental wave period and the characterization values are determined on the basis of the six relative deviations. The gain factors of the individual phase current sensors are preferably determined as the characterization values of the phase current sensors on the basis of the relative deviations. Two phases can therefore be compared with one another per zero crossing. This comparison can be carried out twice with all phase pairs per fundamental wave period. The gain factors of the phase current sensors can be determined from these six comparisons and can be sorted by quantity. The phase current sensors with the highest gain can thus be selected in a simple manner for the current control.

The invention also relates to a motor vehicle having a drive system according to the invention. The motor vehicle is designed as an electrically drivable motor vehicle.

The embodiments presented with reference to the method according to the invention and their advantages apply correspondingly to the control device according to the invention, to the drive system according to the invention and to the motor vehicle according to the invention.

Further features of the invention are set out in the claims, the figures and the description of the figures. The features and feature combinations specified in the description and the features and feature combinations specified below in the description of the figures and/or in the figures alone are usable not only in the respectively indicated combination, but also in other combinations or in isolation.

The invention will now be explained in detail on the basis of a preferred exemplary embodiment and with reference to the drawings, in which:

DETAILED DESCRIPTION OF THE DRAWINGS

Identical and functionally identical elements are denoted with the same reference symbols in the figures.

Figure 1:
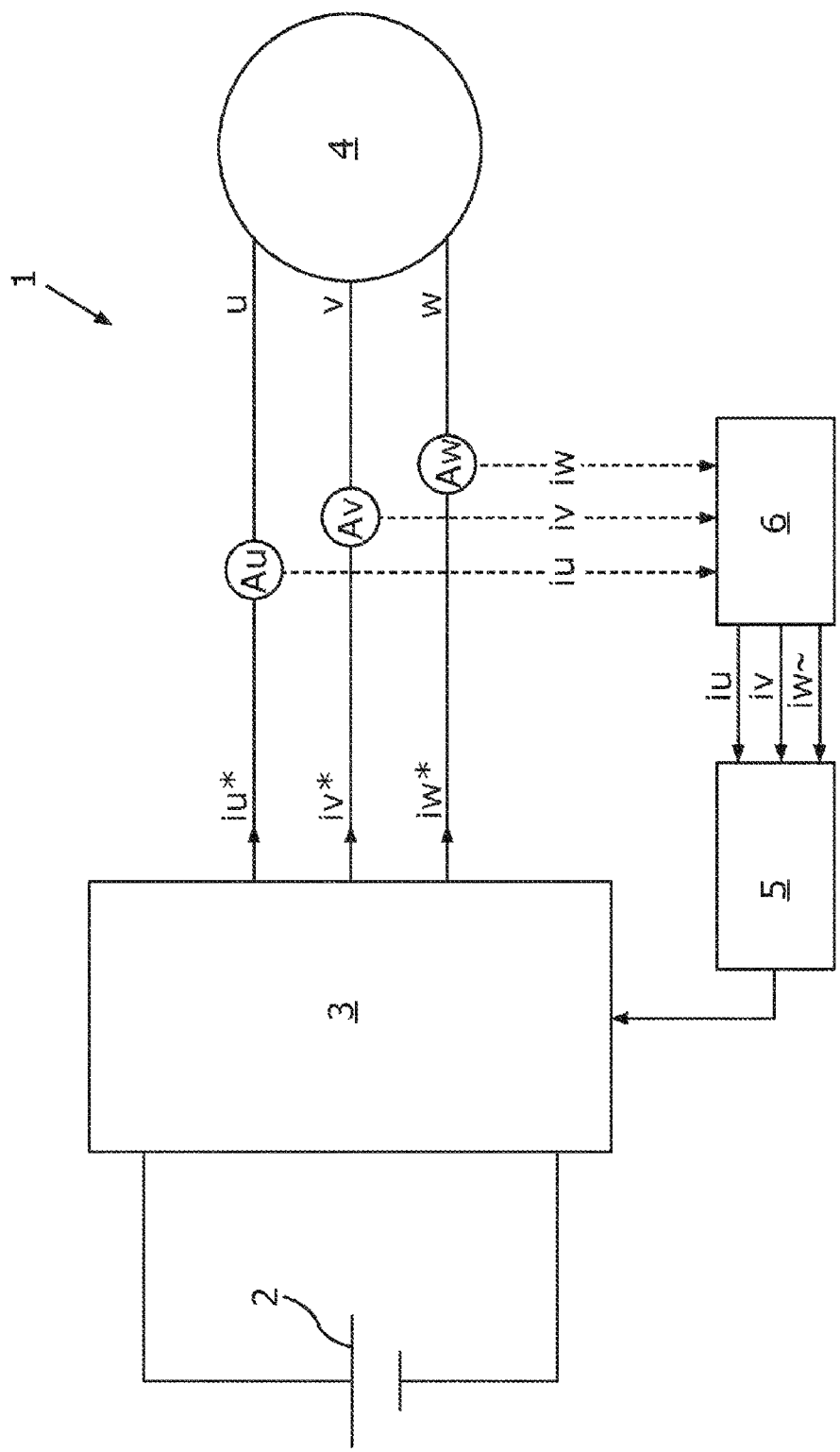
FIG. 1 shows a schematic view of one embodiment of a drive system 1 for a motor vehicle.
Figure 2:
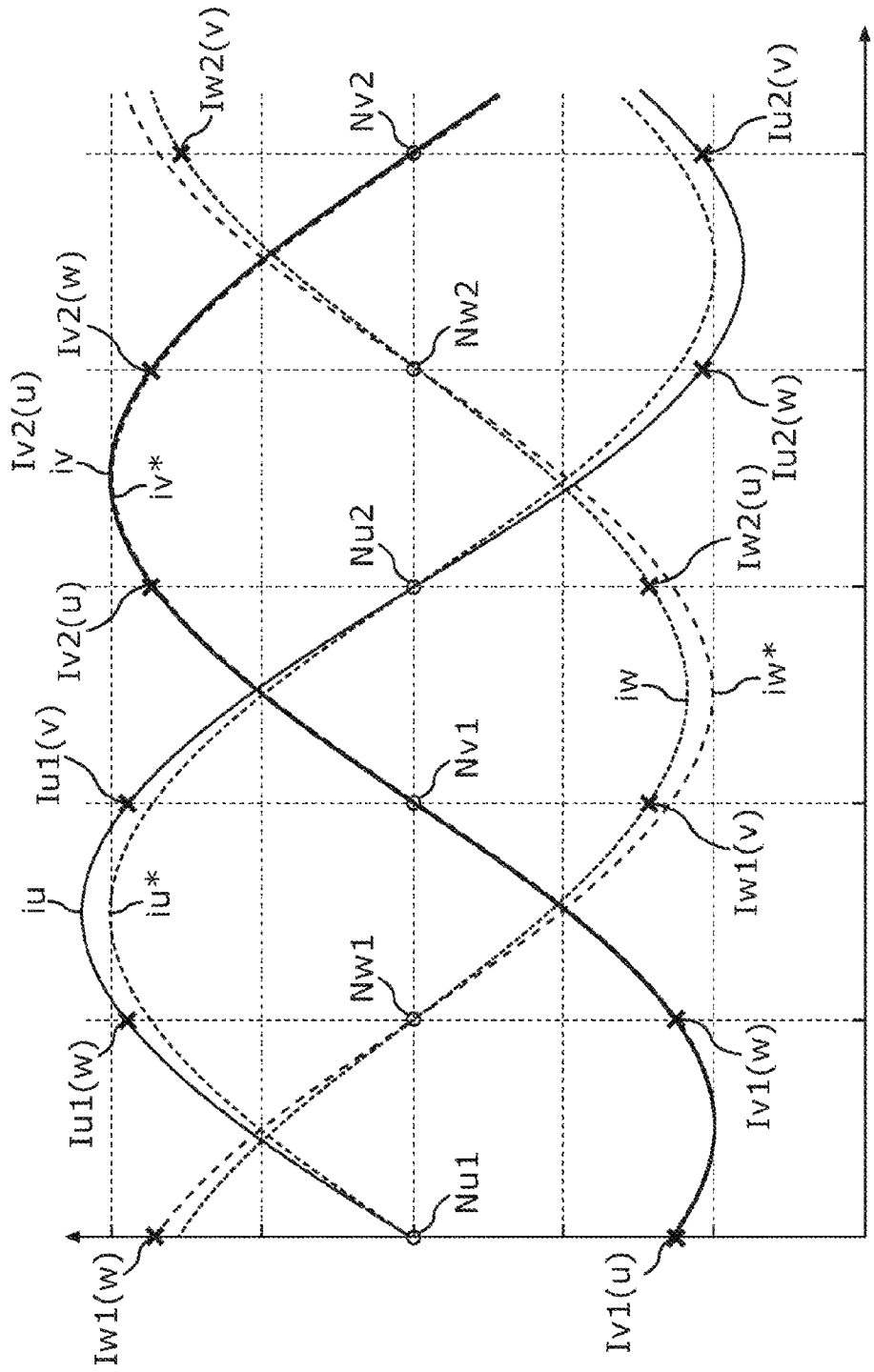
FIG. 2 shows a representation of current characteristics.

FIG. 1 shows a drive system 1 for a motor vehicle having an electrical energy store 2, for example, a high-voltage battery, an inverter 3 connected to the electrical energy store 2 and an electric machine 4 connected to the inverter 3. Here, the electric machine is a three-phase electric machine 4 and has a set of phases with three phases u, v, w. A phase current iu*, iv*, iw* is impressed by the inverter 3 in each case on the phases u, v, w for the delivery of a specific torque by the electric machine 4. These phase currents iu*, iv*, iw* are controlled by a current controller 5 of the drive system 1 for the torque control. To do this, the drive system 1 has a set of phase current sensors for each set of phases. The set of phase current sensors has a first phase current sensor Au assigned to the phase u, a second phase current sensor Av assigned to the phase v and a third phase current sensor Aw assigned to the phase w. The phase current sensors Au, Av, Aw measure the temporal phase current characteristics iu, iv, iw which can deviate from the real phase current characteristics iu*, iv*, iw* due to different gain factors of the phase current sensors Au, Av, Aw. Real actual characteristics iu*, iv*, iw* and the measured characteristics iu, iv, iw which deviate therefrom are shown in FIG. 2. This shows, by way of example, that the measured characteristic iu lies above the real characteristic iu*, the measured characteristic iv corresponds to the real characteristic iv*, and the measured characteristic iw lies below the real characteristic iw*. The first phase current sensor Au therefore has the highest gain factor here and the phase current sensor Aw has the lowest gain factor.

The gain factors of the phase current sensors Au, Av, Aw are taken into consideration in the current control. For this purpose, the characteristics iu, iv, iw measured by the phase current sensors Au, Av, Aw are fed to a control device 6 of the drive system 1. The control device 6 can also be integrated into the current controller 5. The control device 6 is designed to determine the phase currents for the current control taking into consideration the gain factors. To do this, the control device 6 selects the phase current sensors Au, Av with the highest gain factors and feeds the phase currents iu, iv measured by these phase current sensors Au, Av to the current controller 5. The measured current characteristic iw of the phase current sensor Aw with the lowest gain is not fed to the current controller 5, but the current characteristic iw~ is calculated on the basis of the measured phase currents iu, iv and is fed to the current controller 5.

In order to select the phase current sensors Au, Av with the highest gain factors or to filter out the phase current sensor Aw with the lowest gain factor, the control device 6 can determine the respective gain factor or in each case a characterization value of the phase current sensors Au, Av, Aw characterizing the gain factor. To do this, the control device 6, as shown in FIG. 2, determines zero crossings Nu1, Nv1, Nw1, Nu2, Nv2, Nw2 of the measured current characteristics iu, iv, iw. Two zero crossings Nu1, Nv1, Nw1, Nu2, Nv2, Nw2 exist, per fundamental wave period, for each measured characteristic iu, iv, iw. Phase current values Iu1(v), Iu2(v), Iu1(w), Iu2(w), Iv1(u), Iv2(u), Iv1(w), Iv2(w), Iw1(u), Iw2(u), Iw1(v), Iw2(v) of the other characteristics iu, iv, iw are then determined for each zero crossing Nu1, Nv1, Nw1, Nu2, Nv2, Nw2 of a measured characteristic iu*, iv*, iw*. The phase current values Iw1(u) of the characteristic iw and Iv1 (u) of the characteristic iv are therefore determined for the first zero crossing Nu1 of the measured characteristic iu. The phase current values Iv2(u) of the characteristic iv and Iw2(u) of the characteristic iw are determined for the second zero crossing Nu2. The phase current values Iu1 (w) of the characteristic iu and Iv1 (w) of the characteristic iv are determined for the first zero crossing Nw1 of the measured characteristic, etc. The gain factors of the offset-calibrated phase current sensors Au, Av, Aw can then be calculated from the value pairs Iu1(v), Iw1(v); Iu1(w), Iv1(w); Iv1(u), Iw1(u); Iu2(v), Iw2(v); Iu2(w), Iv2(w); Iv2(u), Iw2(u), can be compared with one another. This comparison can be carried out twice with all phase pairs Iu1(v), Iw1(v); Iu1(w), Iv1(w); Iv1(u), Iw1(u); Iu2(v), Iw2(v); Iu2(w), Iv2(w); Iv2(u), Iw2(u) in the course of one rotation, i.e., one fundamental wave period. The end result is a total gain and a differential gain between the phase current sensors Au, Av, Aw themselves. It can then be assumed, in simple terms, that the total gain is "1" and the differential gains correspond to those of the individual phase current sensors Au, Av, Aw. The two phase current sensors Au, Av with the highest gain factors can then be identified on the basis of the differential gains.

The invention claimed is:

1. A method for determining phase currents for current control of an electric machine of a drive system for a motor vehicle, wherein measured characteristics of the phase currents that are fed to at least three phases of a set of phases of the electric machine and that are measured by at least three phase current sensors of a set of phase current sensors of the drive system are received, the method comprising:
   identifying zero crossings in at least three of the measured characteristics of the phase currents;
   determining a phase current value of at least one other measured characteristic of the measured characteristics for at least one zero crossing;
   determining a characterization value, describing a gain factor of each phase current sensor, for each of the phase current sensors, based on the determined phase current values; and
   determining the phase currents for the current control based on the characterization values of the phase current sensors;
   wherein, for each zero crossing of each measured characteristic, the phase current values of the other two measured characteristics are determined, a relative deviation of the gain factors of the two determined phase current sensors is determined based on the phase current values, and the characterization values are determined based on relative deviations; and
   wherein two zero crossings are identified per fundamental wave period of each measured characteristic, the phase current values of the other two measured characteristics are determined at each zero crossing, two relative deviations of the gain factors of the phase current sensors are determined per measured characteristic and the characterization values are determined based on the six relative deviations.

2. The method as claimed in claim 1, wherein the phase currents for the current control are determined by selecting two phase current sensors having highest gain factors based on the characterization values, wherein the two characteristics measured by the two phase current sensors and a third characteristic calculated from the two measured characteristics are provided for the current control.

3. The method as claimed in claim 2, wherein the two phase current sensors with the highest gain factors are selected for the current control by filtering out the phase current sensor with a lowest gain factor based on the characterization values.

4. The method as claimed in claim 1, wherein the relative deviation of the gain factors of two phase current sensors is determined as a difference of associated phase current values in relation to an arithmetic mean value of the phase current values.

5. The method as claimed in claim 1, wherein the gain factors of each of the phase current sensors are determined from the relative deviations as the characterization values of the phase current sensors.

6. A control device for a drive system of a motor vehicle, which is designed to carry out the method as claimed in claim 1.

7. A drive system for a motor vehicle, comprising:
   at least one electric machine with at least one set of phases having at least three phases;
   a set of phase current sensors having at least three phase current sensors for measuring the phase currents fed to the phases; and
   the control device as claimed in claim 6.

8. A motor vehicle having the drive system as claimed in claim 7.

* * * * *